United States Patent
Wehler et al.

(10) Patent No.: US 10,287,960 B2
(45) Date of Patent: May 14, 2019

(54) METHOD FOR DETECTING THE AGING OF A HETEROGENEOUS CATALYTIC CONVERTER, EXHAUST AFTER-TREATMENT SYSTEM FOR AN INTERNAL COMBUSTION ENGINE, AND INTERNAL COMBUSTION ENGINE

(71) Applicant: MTU FRIEDRICHSHAFEN GMBH, Friedrichshafen (DE)

(72) Inventors: Klaus Wehler, Friedrichshafen (DE); Klaus Rusch, Achberg (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 153 days.

(21) Appl. No.: 15/306,619

(22) PCT Filed: Mar. 31, 2015

(86) PCT No.: PCT/EP2015/000693
§ 371 (c)(1),
(2) Date: Oct. 25, 2016

(87) PCT Pub. No.: WO2015/165565
PCT Pub. Date: Nov. 5, 2015

(65) Prior Publication Data
US 2017/0044963 A1 Feb. 16, 2017

(30) Foreign Application Priority Data

Apr. 29, 2014 (DE) ........................ 10 2014 208 095

(51) Int. Cl.
*F01N 11/00* (2006.01)
*F01N 3/20* (2006.01)
(Continued)

(52) U.S. Cl.
CPC .......... *F01N 11/007* (2013.01); *B01D 53/944* (2013.01); *B01D 53/9431* (2013.01);
(Continued)

(58) Field of Classification Search
CPC .......... F01N 11/007; F01N 3/208; F01N 3/11; B01D 53/9431; B01D 53/944; B01D 53/9495
See application file for complete search history.

(56) References Cited

U.S. PATENT DOCUMENTS

| 5,018,348 A | 5/1991 | Duerschmidt et al. |
| 5,267,472 A | 12/1993 | Schneider et al. |

(Continued)

FOREIGN PATENT DOCUMENTS

| DE | 3841685 A1 | 6/1990 |
| DE | 4112478 A1 | 10/1992 |

(Continued)

*Primary Examiner* — Patrick D Maines
(74) *Attorney, Agent, or Firm* — Lucas & Mercanti, LLP; Klaus P. Stoffel

(57) ABSTRACT

A method for detecting the aging of a heterogeneous catalytic converter, including the following steps: acquiring at least one measurement signal in a media flow passing through the catalytic converter downstream of the catalytic converter; applying a time-variant input signal to the media flow and/or the catalytic converter; evaluating a behavior of the at least one measurement signal as a function of the time-variant input signal; and detecting a state of aging of the catalytic converter.

12 Claims, 2 Drawing Sheets

(51) Int. Cl.
*B01D 53/94* (2006.01)
*F01N 13/00* (2010.01)
(52) U.S. Cl.
CPC ......... *B01D 53/9495* (2013.01); *F01N 3/208* (2013.01); *F01N 11/00* (2013.01); *F01N 13/008* (2013.01); *F01N 2550/02* (2013.01); *F01N 2550/03* (2013.01); *F01N 2560/021* (2013.01); *F01N 2560/022* (2013.01); *F01N 2560/023* (2013.01); *F01N 2560/025* (2013.01); *F01N 2560/026* (2013.01); *F01N 2610/02* (2013.01); *F01N 2610/03* (2013.01); *Y02T 10/24* (2013.01); *Y02T 10/47* (2013.01)

(56) References Cited

U.S. PATENT DOCUMENTS

| | | |
|---|---|---|
| 5,363,091 A | 11/1994 | Kotwicki et al. |
| 7,114,329 B2 | 10/2006 | Roesel et al. |
| 2003/0010016 A1* | 1/2003 | Beer ............ F01N 11/00 60/274 |
| 2005/0022508 A1* | 2/2005 | Rosel ............ F01N 11/00 60/277 |
| 2007/0044456 A1* | 3/2007 | Upadhyay ....... B01D 53/9409 60/295 |
| 2009/0100922 A1* | 4/2009 | Korbel ............ F02D 41/1495 73/114.72 |
| 2010/0101214 A1* | 4/2010 | Herman ............ F01N 3/208 60/277 |
| 2012/0085082 A1* | 4/2012 | Levijoki ............ F01N 3/208 60/274 |
| 2012/0180455 A1 | 7/2012 | Severn et al. |

FOREIGN PATENT DOCUMENTS

| | | |
|---|---|---|
| DE | 69228248 T2 | 6/1999 |
| DE | 10332057 A1 | 2/2005 |
| DE | 102011114700 A1 | 4/2012 |
| DE | 102011000153 A1 | 7/2012 |
| DE | 102012217832 A1 | 4/2014 |
| EP | 2180157 A2 | 4/2010 |

* cited by examiner

METHOD FOR DETECTING THE AGING OF A HETEROGENEOUS CATALYTIC CONVERTER, EXHAUST AFTER-TREATMENT SYSTEM FOR AN INTERNAL COMBUSTION ENGINE, AND INTERNAL COMBUSTION ENGINE The present application is a 371 of International application PCT/EP2015/000693, filed Mar. 31, 2015, which claims priority of DE 10 2014 208 095.9, filed Apr. 29, 2014, the priority of these applications is hereby claimed and these applications are incorporated herein by reference.

BACKGROUND OF THE INVENTION

The invention relates to a method for detecting the aging of a heterogeneous catalytic converter, to an exhaust gas after-treatment system for an internal combustion engine and to an internal combustion engine.

Heterogeneous catalytic converters, that is to say catalytic converters whose material is present in a phase or an aggregate state which is different from a phase or an aggregate state of a medium which is to be converted at the catalytic converter have, as an essential functional principle, adsorption or storage of at least one of the components which are involved in a reaction at the catalytic converter. The absorption capacity or storage capacity is subject to aging, which is typically unpredictable, or at any rate virtually unpredictable. In this context, various mechanisms contribute to the aging of the catalytic converter. For example, contamination is possible in which substances which are not involved in the desired reaction adhere permanently to the surface of the catalyst and thereby block binding sites for the surfaces involved in the reaction. Thermal aging is also possible, in particular in that surface regions of a solid catalyst material sinter together to form relatively large particles, with the result that the surface which is available for the catalyst becomes smaller. A change in the basic chemical structure of a catalytic material is also possible over the course of time, wherein binding energy levels at the surface change. This can, on the one hand, lead to a situation in which reactants are bound to the surface to a smaller degree, and it can also lead to a situation in which the binding energy levels are increased so strongly that reactants which have been bound can no longer react and remain bound. As a result, binding locations are in turn occupied and are no longer available for the further catalyst. In particular, owing to the large number of possible aging mechanisms, and the various processes which occur in this context it is virtually impossible to predict the actual aging of a specific catalytic converter. However, it is apparent that modeling of the catalytic reaction requires the storage capacity as an output variable. Such modeling is carried out, in particular in order to be able to operate an internal combustion engine while complying with legal emission limiting values. The modeling is used here, in particular, to regulate an exhaust gas after-treatment system of the internal combustion engine and/or the internal combustion engine itself.

Within the scope of known methods for modeling the catalytic reaction of the catalytic converter, a storage capacity is estimated or assumed to be constant. Aging of the catalytic converter is typically included in the calculations here as a global deterioration factor, which is, under certain circumstances defined with a predetermined time dependence. German laid-open patent application DE 10 2011 114 700 A1 discloses a method for detecting the aging of a catalytic converter, but it depends on a global decline in the conversion rate at the catalytic converter. The storage capacity cannot be detected directly using this method.

SUMMARY OF THE INVENTION

The invention is therefore based on the object of providing a method which does not have the specified disadvantages, wherein it permits, in particular, a precise and direct detection of the storage capacity within the scope of the detection of aging of the catalytic converter. Furthermore, the invention is based on the object of providing an exhaust gas after-treatment system as well as an internal combustion engine which do not have the specified disadvantages.

The object is achieved in that a method in which at least one measurement signal is detected downstream of the catalytic converter in a media flow which passes through the catalytic converter. A time-variant input signal is applied to the media flow and/or the catalytic converter, and a behavior of the at least one measurement signal is evaluated as a function of the time-variant input signal. In this way, a state of aging of the catalytic converter is determined. The behavior of the at least one measurement signal, which is considered, as it were, as a response to the time-variant input signal, depends here directly on the storage capacity of the heterogeneous catalytic converter. In this context, this, and therefore also the state of aging of the catalytic converter, can be detected directly from the behavior of measurement signal in a simple, safe and reliable fashion. The method proposed here accordingly provides a direct way of measuring the storage capacity of the heterogeneous catalytic converter.

The term "time-variant input signal" denotes here, in particular, a signal which changes, preferably periodically, over the course of time. It preferably has a specific waveform, for example a sinusoidal or square-waveform or else a complex waveform, which can preferably be represented as an arrangement of superimposed simple waveforms. The input signal preferably has a defined frequency, amplitude and/or phase angle. This does not rule out the possibility that at least one parameter of the input signal, in particular one of the abovementioned parameters, is changed within the scope of the method. For example, it is possible for the frequency, the amplitude and/or the phase angle of the input signal to be changed within the scope of the method.

The at least one measurement signal is detected, in particular, as a function of time. In this context, its time-dependent behavior is evaluated as a function of the time-variant input signal. A frequency and/or a phase angle of the input signal are/is preferably known and/or are/is defined, which significantly simplify the evaluation of the behavior of the measurement signal. In particular, the latter can be evaluated with respect to the frequency and/or the phase angle of the input signal.

The state of aging of the catalytic converter is preferably determined by means of a comparison of the evaluated behavior of the at least one characteristic curve and/or at least one characteristic diagram, wherein the characteristic curve and/or the characteristic diagram comprise/comprises states of aging of the catalytic converter which are assigned to the behavior of the measurement signals. Alternatively or in addition, it is possible to determine the state of aging of the catalytic converter by means of a model into which the behavior of the measurement signal is input as an input variable. The storage capacity of the catalytic converter is preferably determined directly as a state of aging.

An embodiment of the method is preferred which is distinguished by the fact that the method is carried out for the exhaust gas after-treatment of an internal combustion engine. In particular, within the scope of the method a state of aging of the catalytic converter is preferably determined which is used in an exhaust gas after-treatment system of an internal combustion engine. The method is preferably here part of an open-loop or closed-loop controller of the internal combustion engine. In particular, the state of aging which is determined using the method, preferably the storage capacity of the catalytic converter, is input into a modeling of the catalytic reaction within the scope of the open-loop or closed-loop controller of the exhaust gas after-treatment system and/or of the internal combustion engine, wherein this modeling requires the storage capacity as an output variable. The catalytic converter can preferably be a catalytic converter which is configured for the selective catalytic reduction of nitrogen oxides (SCR catalytic converter) and/or an oxidation catalytic converter.

An embodiment of the method is preferred which is distinguished by the fact that a change in amplitude of the at least one measurement signal is used for the detection of aging. It becomes specifically apparent that the amplitude of the measurement signal depends on the state of aging of the catalytic converter. Alternatively, or in addition, a change in the phase angle of the at least one measurement signal, in particular a phase shift thereof relative to the input signal, is preferably used for the detection of aging. It becomes specifically apparent that the phase angle also depends on the state of aging of the catalytic converter. In one preferred embodiment of the method, parameters of the time-variant input signal, in particular its frequency and/or phase angle, are kept constant. In this context, the change in amplitude and/or the change in the phase angle of the measurement signal, in particular with respect to the input signal, provides information about the aging of the catalytic converter when the parameters of the input signal are kept constant.

An embodiment of the method is also preferred which is distinguished by the fact that the time-variant input signal is changed. In particular, at least one parameter of time-variant input signal, for example the frequency, the phase angle and/or the amplitude, are/is preferably changed. A response by the at least one measurement signal to the change in the input signal is used for detection of aging. It has specifically become apparent that the measurement signal in a characteristic way, as a function of the storage capacity of the catalytic converters reacts to the change in the input signal. This reaction of the measurement signal can therefore be used for the detection of aging and, in particular, for the determination of the storage capacity of the catalytic converter. In this context, a dynamic response or reaction by the measurement signal to the changing of the input signal is preferably considered.

An embodiment of the method is also preferred which is distinguished by the fact that the time-variant input signal is changed under conditions which are otherwise kept constant for the catalytic converter. This means, in particular, that preferably only the time-variant input signal is changed, while all the other peripheral conditions for the operation of the catalytic converter are kept constant. As a result, combination or mixing of various effects on the measurement signal is avoided and the detection of aging can be carried out with a particularly high level of accuracy. Just one parameter of the time-variant input signal, for example only the frequency, only the phase angle or only the amplitude is particularly preferably changed, while all the other parameters of the input signal and preferably also all the other operating conditions for the catalytic converter remain unchanged. As a result, the accuracy of the method can be increased further, since the dynamic response of the measurement signal with respect to the storage capacity of the catalytic converter is all the more characteristic the lower the number of changed conditions. For example, it is possible that a mass flow of the medium which is to be converted catalytically which passes through the catalytic converter, for example a mass flow of exhaust gas of an internal combustion engine and/or a temperature in the region of the catalytic converter are kept constant as a condition for the catalytic converter.

Alternatively or in addition, an embodiment of the method is also preferred which is distinguished by the fact that a dependence of the at least one measurement signal on at least one condition for the catalytic converter, in particular a reaction of the at least one measurement signal to at least one changed condition for the catalytic converter, is used for the detection of aging. In this context, a dependence of the chronological behavior of the measurement signal on at least one peripheral condition of the catalytic converter is preferably used. For example, the damping of the system as a function of the temperature of the catalytic converter can be stored as a characteristic curve, wherein the aging of the catalytic converter is determined from the aging of the damping compared to the stored characteristic curve. The measurement signal is evaluated as a function of the input signal here insofar as the damping is considered, which also depends on the time-variant input signal.

An embodiment of the method is preferred which is distinguished by the fact that two different measurement signals are detected downstream of the catalytic converter and their behavior is evaluated as a function of the time-variant input signal. In this context it is possible that the two measurement signals are considered separately from one another, wherein, for example for each of the measurement signals, a change in amplitude and/or a change in the phase angle are/is evaluated. Depending on the peripheral conditions, the one measurement signal or the other is preferably used for the detection of aging. Alternatively it is possible that both measurement signals are evaluated or considered together, wherein, for example, storage capacities of the catalytic converter which are calculated from the measurement signal are compared with one another and/or set off against one another, for example in the sense of a formation of mean values. It is possible here that the storage capacities which are determined by means of the various measurement signals are weighted during their calculation, for example in that a weighted mean value is formed. By evaluating or considering the two different measurement signals together it is possible to introduce redundancy into the method, with the result that its accuracy increases. On the other hand, if the signals are considered separately from one another, that measurement signal which permits more precise detection of aging can always be selected as a function of otherwise prevailing conditions.

An embodiment of the method is preferred which is distinguished by the fact that a phase shift between a first and a second measurement signal is used for the detection of aging. In particular, a change in the phase shift is preferably used for the detection of aging. A relative phase angle between two different measurement signals is therefore observed, wherein this phase angle and, in particular, the change therein provide information about the storage capacity and the state of aging of the catalytic converter. It is possible that the phase shift is considered with constant parameters of the time-variant input signal, with the result that the latter is not changed. It is also possible that the phase shift is considered and evaluated as a dynamic response to a change in the time-variant input signal. In this context, in particular an analysis of the dynamic response of the catalytic converter to defined changes in input conditions is carried out. It becomes apparent that aging of the catalytic converter and, in particular, a change in its storage capacity gives rise to a change in its dynamic behavior and therefore, in particular, to a change in the dynamic response of the measurement signals to the changed input conditions. Particularly precise detection of aging can be carried out by considering the phase shift between two different measurement signals.

An embodiment of the method is also preferred which is distinguished by the fact that a quantity of pre-determined substance, which has been converted at the catalytic converter, is detected in the media flow as the first and/or second measurement signal. A concentration or a partial pressure of the substance in the media flow is considered to be a quantity of the substance. The media flow here is preferably an exhaust gas of an internal combustion engine. The substance which is to be converted at the catalytic converter can be a nitrogen oxide. A total nitrogen oxide concentration or a total nitrogen oxide partial pressure in the exhaust gas can be used as the measurement signal. Alternatively or in addition, a quantity of reducing agent in the exhaust gas can be used as the measurement signal. The reducing agent here is preferably ammonia or an ammonia precursor substance, for example a urea-water solution. In particular, ammonia slip downstream of the catalytic converter is therefore preferably measured as the measurement signal. The use of a nitrogen oxide concentration, wherein the term concentration is used here synonymously for the term partial pressure, and/or a reducing agent concentration are/is preferred in a catalytic converter which is embodied as an SCR catalytic converter. It is also possible that a carbon monoxide concentration and/or a hydrocarbon concentration are/is used as the measurement signal. These measurement signals are preferably used if an oxidation catalytic converter is used as the catalytic converter. It is also possible to use a lambda value as the measurement signal.

An embodiment of the method is preferred which is distinguished by the fact that a metering signal is used as an input signal for a substance which is to be metered into the media flow upstream of the catalytic converter and is to be converted at the catalytic converter. The metering signal serves here preferably to actuate a metering device for metering the substance into the media flow. In this context, a frequency and/or phase angle of the metering signal are/is known and/or can be predefined. In particular, the frequency and/or the phase angle of the metering signal are/is preferably variable, with the result that the time-variant input signal can be changed with respect to at least one of these parameters. In this context, a frequency for the metering of a reducing agent into an exhaust gas flow of an internal combustion engine is typically less than 10 Hz. A reducing agent, in particular a urea-water solution or ammonia can typically be used as the substance to be metered in. This is preferably the case if an SCR catalytic converter is used as the catalytic converter. A fuel, in particular a hydrocarbon, can also be used as the substance to be metered in. This is particularly preferred if an oxidation catalytic converter is used as the catalytic converter.

An embodiment of the method is also preferred which is distinguished by the fact that a metering signal for a substance which is to be metered into the media flow upstream of the catalytic converter and is to be converted at the catalytic converter is generated as a function of the determined state of aging. The metering signal is therefore adapted to the storage capacity and therefore to the aging of the catalytic converter. Precise adjustment of the parameters of a catalytic conversion system, in particular of an exhaust gas after-treatment system to the state of aging of the catalytic converter, is therefore possible. For example, the metering frequency of a reducing agent valve in an SCR system can be kept to a minimum, and in this way the service life of the reducing agent valve can therefore be maximized. In particular, in this context a lower value can be selected for the metering frequency in a new state of the catalytic converter, with the value being increased as the catalytic converter progressively ages. It becomes apparent, specifically, that in the new state the catalytic converter with a high storage capacity has a highly damping effect on the behavior of the measurement signal as a function of the input signal. The measurement signal therefore does not fluctuate to a particularly large extent even if the input signal has a low frequency. In contrast, the inertia of the catalytic system is reduced as the storage capacity decreases, with the result that the latter reacts in a more dynamic fashion to changes in the input signal and, in particular, also to variations in the input signal over time. The damping effect decreases, with the result that relatively strong fluctuations in the measurement signal occur as a function of the time-variant input signal. In this case, it is favorable to increase the frequency of the input signal, as a result of which the fluctuations in the measurement signal over time can be reduced. A shortening of the timescale over which the catalytic converter reacts dynamically is therefore preferably responded to by raising the frequency of the input signal.

The object is also achieved by providing an exhaust gas after-treatment system for an internal combustion engine. The exhaust gas after-treatment system has a heterogeneous catalytic converter as well as an input signal-generating means for applying a time-variant input signal to a media flow passing through the catalytic converter and/or the catalytic converter, wherein the input signal-generating means is preferably arranged upstream of the catalytic converter. At least one sensor is provided for detecting at least one measurement signal. The sensor is preferably arranged downstream of the catalytic converter. The exhaust gas after-treatment system is defined by a control unit which is configured to carry out a method as claimed in one of the embodiments described above. Therefore, the advantages which have already been explained in respect of the method are implemented in respect of the exhaust gas after-treatment system.

The control unit is preferably configured to carry out the method by virtue of the fact that said control unit is fixedly implemented in an electronic structure, in particular in hardware of the control unit. Alternatively, it is possible that a computer program product is loaded into the control unit, which computer program product comprises instructions on the basis of which the method is carried out when the computer program product runs on the control unit. The control unit is preferably operatively connected to the input signal-generating means and to the at least one sensor for detecting at least one measurement signal, in order to be able to carry out the method.

It is possible to use a single sensor within the scope of the method. In this context, it is possible that just one measurement signal is detected. Alternatively, it is possible that the one sensor is sensitive to two different measurement signals, for example in the sense of lateral sensitivity. It is therefore possible, for example, that one and the same sensor is sensitive both to a nitrogen oxide concentration and to an ammonia concentration in the exhaust gas. Alternatively, it is possible that at least two sensors, preferably precisely two sensors, are provided which are preferably designed to detect at least two different measurement signals. In this context, the sensors are also preferably embodied in different ways. For example, it is possible for a first sensor to be embodied as a nitrogen oxide sensor, wherein a second sensor is embodied as an ammonia sensor.

An exemplary embodiment of the exhaust gas aftertreatment system is preferred which is distinguished by the fact that the catalytic converter is embodied as an SCR catalytic converter. Alternatively, it is possible that the catalytic converter is embodied as an oxidation catalytic converter. As a further alternative it is possible that the catalytic converter is embodied as a particle filter which has a catalytically active coating, in particular an SCR coating or an oxidatively catalytic coating. The method can advantageously be applied in all the catalytic converters mentioned here for the detection of aging.

An exemplary embodiment of the exhaust gas aftertreatment system is also preferred which is distinguished by the fact that the input signal-generating means is embodied as a metering device for a substance which is to be metered into the media flow upstream of the catalytic converter and is to be converted at the catalytic converter. In this context, a frequency, a phase angle and/or an amplitude of the metering device can preferably be set. An opening stroke of a valve of the metering device can preferably be set as the amplitude. The metering device can be designed to meter in a reducing agent, in particular a urea-water solution or ammonia. It is also possible that the metering device is designed to meter in a fuel, in particular a hydrocarbon. An exemplary embodiment of the exhaust gas after-treatment system is also preferred which is distinguished by the fact that the sensor is embodied as a nitrogen oxide sensor, as an ammonia sensor, as a carbon monoxide sensor, as a hydrocarbon sensor and/or as a lambda sensor. In this context, a nitrogen oxide sensor and/or an ammonia sensor, in particular in conjunction with a catalytic converter which is embodied as an SCR catalytic converter or a particle filter with an SCR coating are/is preferred. A sensor which is embodied as a carbon monoxide sensor, as a hydrocarbon sensor and/or as a lambda sensor is preferably preferred in conjunction with a catalytic converter which is embodied as an oxidation catalytic converter or as a particle filter with an oxidatively catalytic coating. It is possible that the nitrogen oxide sensor is embodied as a sensor with lateral sensitivity to ammonia. In this way it is possible to measure the nitrogen oxide concentration and the ammonia concentration in conjunction with just a single sensor. Alternatively, it is possible that separate sensors are provided for the nitrogen oxide concentration, on the one hand, and the ammonia concentration, on the other.

The object is finally also achieved in that an internal combustion engine that has an exhaust gas after-treatment system as described in one of the exemplary embodiments described above. Therefore, the advantages which have already been explained in conjunction with the method and the exhaust gas after-treatment system are implemented in conjunction with the internal combustion engine.

The internal combustion engine is preferably embodied as a reciprocating piston engine. In one preferred exemplary embodiment, the internal combustion engine serves to drive, in particular, heavy land vehicles or water craft, for example mining vehicles, trains, wherein the internal combustion engine is used in a locomotive or a tractive unit, or ships. It is possible to use the internal combustion engine to drive a vehicle which is used for defense purposes, for example a tank. An exemplary embodiment of the internal combustion engine is preferably also used in a stationary fashion, for example for the stationary supply of energy in an emergency current operating mode, continuous load mode or peak load mode, wherein the internal combustion engine preferably drives a generator in this case. A stationary application of the internal combustion engine for driving auxiliary assemblies, for example firefighting pumps on drilling rigs is also possible. Furthermore, an application of the internal combustion engine is possible in the field of the extraction of fossil raw materials and, in particular, fuels, for example oil and/or gas. The use of the internal combustion engine in the industrial field or in the construction industry, for example in a construction or building machine, for example in a crane or an excavator, is also possible. The internal combustion engine is preferably embodied as a diesel engine, as a gasoline engine, as a gas engine for operation with natural gas, biogas, special gas or some other suitable gas. In particular if the internal combustion engine is embodied as a gas engine, it is suitable for use in a cogeneration unit for the stationary generation of energy.

The description of the method, on the one hand, and of the exhaust gas after-treatment system and of the internal combustion engine, on the other, are to be understood as being complementary to one another. Features of the exhaust gas after-treatment system or of the internal combustion engine which have been explicitly or implicitly described in conjunction with the method are preferably individual, or when combined with one another, features of an exemplary embodiment of the exhaust gas after-treatment system or of the internal combustion engine. Method steps which have been described explicitly or implicitly in conjunction with the exhaust gas after-treatment system or the internal combustion engine are preferably individually, or when combined with one another, method steps of a preferred embodiment of the method. The method is preferably distinguished by at least one method step which is conditioned by at least one feature of the exhaust gas after-treatment system or of the internal combustion engine. The exhaust gas after-treatment system or the internal combustion engine is preferably distinguished by at least one feature which is conditioned by at least one method step of the method.

The invention will be explained in more detail with reference to the drawing, in which:

DETAILED DESCRIPTION OF THE INVENTION

Figure 1:
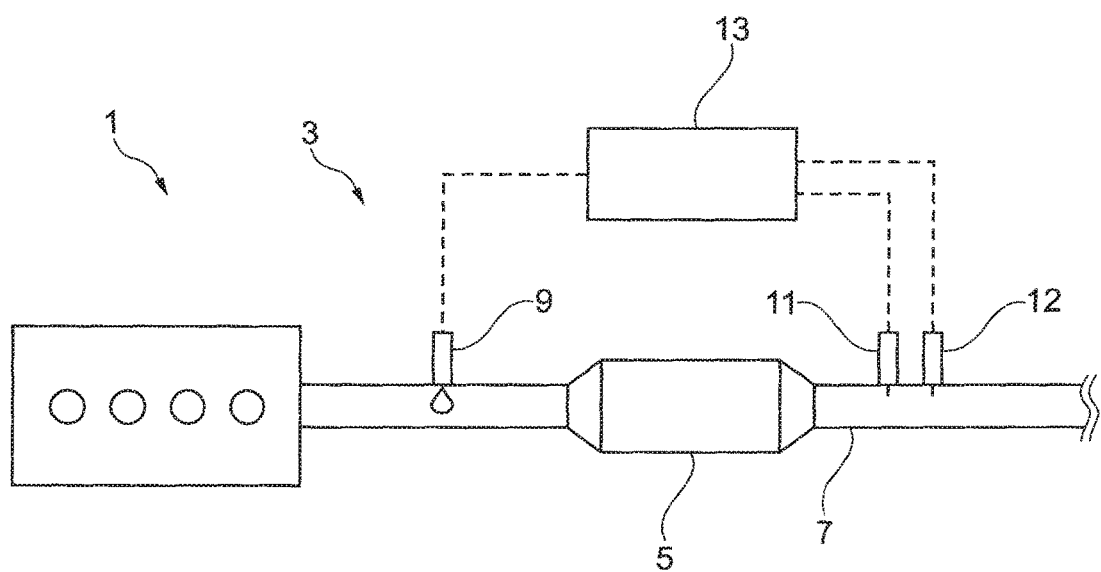
FIG. 1 shows a schematic illustration of an exemplary embodiment of an internal combustion engine having an exhaust gas after-treatment system.

FIG. 1 shows a schematic illustration of an exemplary embodiment of an internal combustion engine 1 which has an exhaust gas after-treatment system 3. The exhaust gas after-treatment system 3 has a heterogeneous catalytic converter 5 which is arranged in an exhaust train 7 of the internal combustion engine 1. Exhaust gas can be conducted along the exhaust train 7 as a media flow which passes through the catalytic converter 5, wherein at least specific substances included in the exhaust gas are converted at the catalytic converter 5.

An input signal-generating means 9, which is configured to apply a time-variant input signal to the media flow flowing in the exhaust train 7 is provided upstream of the catalytic converter 5. A first sensor 11 and a second sensor 12 are provided downstream of the catalytic converter 5 and are configured to detect two different measurement signals in the media flow which is guided through the exhaust train 7, and consequently in the exhaust gas of the internal combustion engine 1. In order to carry out the method, a control unit 13 is provided which is operatively connected, on the one hand, to the input signal-generating means 9 and, on the other hand, to the sensors 11, 12. In this context, the control unit 13 is configured to carry out an embodiment of the method described above.

In one preferred exemplary embodiment of the internal combustion engine 1 and of the exhaust gas after-treatment system 3, the catalytic converter 5 is embodied as an oxidation catalytic converter. In this case, the input signal-generating means 9 is preferably configured as a metering device for metering a fuel, in particular a hydrocarbon, into the flow of exhaust gas, wherein the fuel is converted at the oxidation catalytic converter 5. This can serve, for example, to raise a temperature of the exhaust gas. The sensors 11, 12 are in this case preferably embodied as a carbon monoxide sensor, a hydrocarbon sensor and/or as a lambda sensor.

In another exemplary embodiment of the internal combustion engine 1 and of the exhaust gas after-treatment system 3, the catalytic converter 5 is preferably embodied as an SCR catalytic converter for the selective catalytic reduction of nitrogen oxides which are included in the exhaust gas upstream of the catalytic converter 5. The input signal-generating means 9 is preferably embodied here as a metering device for metering in a reducing agent, in particular a urea-water solution or ammonia. The sensors 11, 12 are in this case preferably embodied as a nitrogen oxide sensor and as an ammonia sensor, the latter for detecting an ammonia slip. As an alternative to the two sensors 11 and 12, it is also possible to provide a single sensor by means of which both a nitrogen oxide concentration and an ammonia concentration in the exhaust gas can be measured. This sensor can therefore be a nitrogen oxide sensor with lateral sensitivity to ammonia. One preferred embodiment of the method is explained here with reference to FIG. 2. The method is carried out here for the detection of aging of an SCR catalytic converter in an exhaust gas after-treatment system 3 of an internal combustion engine 1, wherein an input signal-generating means 9 is used which is embodied as a metering device for a urea-water solution or ammonia, and wherein a measurement signal of a nitrogen oxide sensor and a measurement signal of an ammonia sensor are used as the two different measurement signals. It is also possible for the nitrogen oxide concentration and the ammonia concentration to be measured by one and the same sensor, for example by a nitrogen oxide sensor with lateral sensitivity to ammonia. An ammonia slip also occurs when a urea-water solution is used as the reducing agent because the urea in the exhaust gas is converted to ammonia and water, typically upstream of the SCR catalytic converter, wherein ammonia acts as a reducing agent in the SCR catalytic converter.

The catalytic converter 5 here has a storage capacity for ammonia which decreases as the aging of the catalytic converter 5 progresses. This can be detected within the scope of the method.

Figure 2:
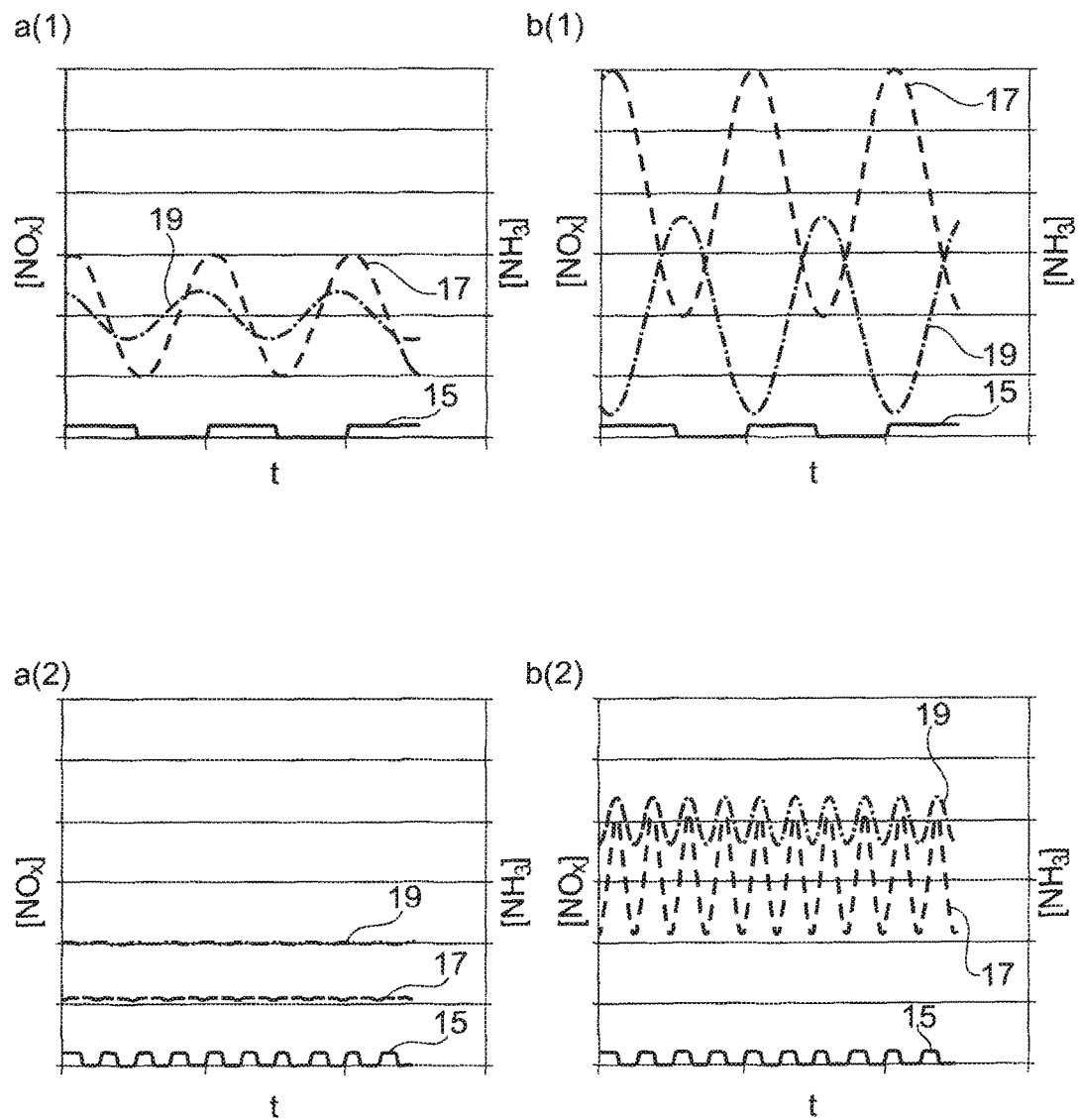
FIG. 2 shows schematic, diagrammatic illustrations of the behavior of measurement signals as a function of an input signal within the scope of an embodiment of the method.

In order to explain the method, FIG. 2 shows various diagrammatic illustrations, wherein the left-hand side diagrams which are characterized by the letter a correspond to a catalytic converter in the new state, and the right-hand side illustrations which are characterized by the letter b correspond to an aged catalytic converter. The upper diagrams which are characterized by the number (1) are assigned to an input signal with a first, relatively low frequency, wherein the lower diagrams which are characterized by the number (2) are assigned to an input signal with a second, relatively high predetermined frequency. In all the diagrams illustrated in FIG. 2, an input signal 15 is illustrated as an unbroken line. Said input signal 15 is embodied here as a square-wave signal and serves to actuate a metering device for a urea-water solution or for ammonia. In the case of the diagrams characterized by the number (1), a frequency of the input signal 15 is preferably approximately 1 Hz. In the case of the diagrams characterized by the number (2), the frequency of the input signal is preferably approximately 4 Hz. Furthermore, in all the illustrated diagrams the profile of a nitrogen oxide concentration $[NO_x]$ is illustrated as a first measurement signal 17 with a dashed curve as a function of the time t. A profile of an ammonia concentration $[NH_3]$ is illustrated in all the diagrams as a second measurement signal 19 with a dot-dash curve as a function of the time t.

The following becomes apparent: on the basis of FIG. 2a(1) it becomes apparent that in the new state of the catalytic converter 5 the input signal 15, the first measurement signal 17 and the second measurement signal 19 have specific phase angles, in particular specific phase shifts in relation to one another. Furthermore, the measurement signals 17, 19 have specific amplitudes.

If a frequency of the input signal 15 is increased, this gives rise, as illustrated in FIG. 2a(2), to strong damping of the measurement signals 17, 19, which then have, as it were, a constant profile. This is because of the high storage capacity of the new catalytic converter 5, wherein fluctuations in the metered-in quantity of reducing agent are readily compensated by the buffer effect of the reducing agent stored in the catalytic converter, and the signals 17, 19 are therefore leveled or strongly damped. There is therefore, in particular, a resulting defined dynamic response of the system to the change in the frequency of the input signal 15.

From FIG. 2b(1) it becomes clear that during the aging of the catalytic converter 5 both the amplitude of the measurement signals 17, 19 and the phase angle thereof change. In particular, a phase shift between the second measurement signal 19, consequently the ammonia concentration, and the input signal 15 changes. At the same time, the phase shift between the second measurement signal 19 and the first measurement signal 17 changes significantly. These changes in the phase shifts are caused by the decreasing storage capacity of the catalytic converter 5 and are characteristic thereof. At the same time, owing to the relatively small storage capacity the catalytic converter 5 can then only act as a buffer for the reducing agent with relatively low efficiency, with the result that the amplitudes of the signals 17, 19 and therefore the fluctuations thereof increase significantly as a function of the input signal 15. This behavior is also characteristic of the aging of the catalytic converter 5.

From FIG. 2b(2) it becomes apparent that the dynamic response of the system to an increase in the frequency of the input signal 15 also turns out to be significantly different from the dynamic response in the new state if the catalytic converter 5 is aged and has a reduced storage capacity. The system reacts here in a fundamentally more dynamic fashion and the measurement signals 17, 19 are consequently damped to a much lower extent than in the new state of the catalytic converter. This decrease in the damping and increase in the dynamic behavior of the system are characteristic of the state of aging of the catalytic converter 5. At the same time, the dynamic changing of the signal amplitudes and of the phase angles of the measurement signals 17, 19, in particular of the phase shifts relative to one another and/or relative to the input signal are characteristic of the state of aging.

From FIG. 2b(1) it also becomes apparent that a change in amplitude and/or a change in the phase angle of one of the measurement signals 17, 19, under certain circumstances relative to the input signal 15, can be used per se for the detection of aging. However, it is also possible to consider this information in a combined fashion.

Furthermore, it is possible to use the change in the phase shift, in particular, between the two measurement signals 17, 19 while the input signal 15 remains the same for the detection of aging. Alternatively, or in addition, it is possible that the input signal 15 is varied in terms of one parameter, in particular in terms of its frequency, wherein a dynamic change in at least one measurement signal 17, 19, preferably in both measurement signals 17, 19, is used for the detection of aging. In this context it is possible to use the changes in amplitude and/or phase of the measurement signals 17, 19.

The various procedures are preferably combined with one another. This permits the accuracy of the method to be increased.

It is preferably possible that the input signal 15 is changed, for example in respect of its frequency, in predetermined time intervals, in order to examine the dynamic response of the system to such a change. In addition or alternatively, a change in the amplitude and/or phase angle of the measurement signals 17, 19 can be monitored in predetermined time intervals or else continuously.

Overall it becomes apparent that the method, the exhaust gas after-treatment system and the internal combustion engine permit simple, cost-effective and precise direct detection of the storage capacity of the catalytic converter 5, and said storage capacity can therefore be used with a high degree of accuracy, in particular, as an input variable for modeling the catalytic reaction.

The invention claimed is:

1. A method for detecting aging of a heterogeneous catalytic converter, comprising the steps of:
   detecting two different measurement signals including a first measurement signal and a second measurement signal, in a media flow passing through the catalytic converter, downstream of the catalytic converter;
   applying a time-variant input signal to the media flow and/or the catalytic converter;
   evaluating behavior of the two measurement signals as a function of the time-variant input signal; and
   determining a state of aging of the catalytic converter using a phase shift between the first measurement signal and the second measurement signal for detecting aging.

2. The method according to claim 1, including changing the time-variant input signal and using a response by the at least one measurement signal to the change in the input signal for detecting aging.

3. The method according to claim 2, including changing the time-variant input signal under conditions which are otherwise kept constant for the catalytic converter.

4. The method according to claim 1, including using a dependence of the at least one measurement signal on at least one condition for the catalytic converter for detecting aging.

5. The method according to claim 1, including detecting a quantity of pre-determined substance, which has been converted at the catalytic converter, in the media flow as the first measurement signal and/or as the second measurement signal.

6. The method according to claim 1, including using a metering signal as an input signal for a substance to be metered into the media flow upstream of the catalytic converter and to be converted at the catalytic converter.

7. The method according to claim 1, including generating a metering signal for a substance to be metered into the media flow upstream of the catalytic converter and to be converted at the catalytic converter as a function of the determined state of aging of the catalytic converter.

8. An exhaust gas after-treatment system for an internal combusting engine, comprising: a heterogeneous catalytic converter; an input signal-generator for applying a time-variant input signal to a media flow and/or the catalytic converter; at least one sensor for detecting two different measurement signals; and a control unit configured to carry out the method according to claim 1.

9. The exhaust gas after-treatment system according to claim 8, wherein the catalytic converter is an SCR catalytic converter or an oxidation catalytic converter.

10. The exhaust gas after-treatment system according to claim 8, wherein the input signal-generator is a metering device for a substance to be metered into the media flow upstream of the catalytic converter and to be converted at the catalytic converter.

11. The exhaust gas after-treatment system according to claim 8, wherein the at least one sensor is one of: a nitrogen oxide sensor, an ammonia sensor, a carbon monoxide sensor, a hydrocarbon sensor or a lambda sensor.

12. An internal combustion engine, comprising an exhaust gas after-treatment system according to claim 8.

* * * * *